United States Patent [19]
Allgulin

[11] Patent Number: 5,618,439
[45] Date of Patent: Apr. 8, 1997

[54] METHOD FOR PURIFYING INDUSTRIAL SEWAGE WATER

[75] Inventor: Torkel Allgulin, Helsingborg, Sweden

[73] Assignee: Boliden Contech AB, Stockholm, Sweden

[21] Appl. No.: 216,957

[22] Filed: Mar. 24, 1994

[30] Foreign Application Priority Data

Apr. 20, 1993 [SE] Sweden .................................. 9301283

[51] Int. Cl.$^6$ .................................. C02F 1/52; C02F 1/62; C02F 1/72
[52] U.S. Cl. .......................... 210/713; 210/906; 210/911; 210/912; 210/758; 210/722
[58] Field of Search ..................... 210/713, 911, 210/912, 906, 758, 722

[56] References Cited

U.S. PATENT DOCUMENTS

| | | | |
|---|---|---|---|
| 3,617,559 | 11/1971 | Cywin | 210/713 |
| 3,738,932 | 6/1973 | Kostenbader | 210/713 |
| 4,320,012 | 3/1982 | Palm et al. | 210/713 |
| 4,465,597 | 8/1984 | Herman et al. | 210/713 |
| 4,543,189 | 9/1985 | Rice et al. | 210/713 |
| 4,566,975 | 1/1986 | Allgulin | 210/713 |
| 4,606,829 | 8/1986 | Rice et al. | 210/713 |
| 4,657,680 | 4/1987 | Zibrida | 210/713 |
| 4,698,163 | 10/1987 | Zibrida | 210/713 |
| 5,039,428 | 8/1991 | Wentzler et al. | 210/713 |

FOREIGN PATENT DOCUMENTS

| | | | |
|---|---|---|---|
| 139622 | 5/1985 | European Pat. Off. | |
| 137987 | 6/1991 | Japan | 210/713 |
| 267994 | 9/1992 | Japan | 210/713 |
| 1518357 | 7/1978 | United Kingdom | |
| 2216114 | 10/1989 | United Kingdom | 210/713 |
| 93/09064 | 5/1993 | WIPO | |

*Primary Examiner*—Neil McCarthy
*Attorney, Agent, or Firm*—Burns, Doane, Swecker & Mathis

[57] ABSTRACT

A method for purifying aqueous solutions having varying concentrations of contaminants and/or various contaminants including ions of several metals and elements by conducting precipitation in a first precipitation stage by adding lime in a surplus quantity whereby a pH of about 12 is established and maintained in the solution and a major part of the contaminant content is precipitated so as to form a solution having a substantially constant composition and to form a precipitate that is isolated and removed together with residual lime. Precipitation is then conducted in a second precipitation stage by adding a reagent for precipitation at a pH in the range of 4–11 wherein residual contaminant in the formed solution from the first precipitation stage is precipitated the precipitate is isolated and returned to the first precipitation stage.

17 Claims, 1 Drawing Sheet

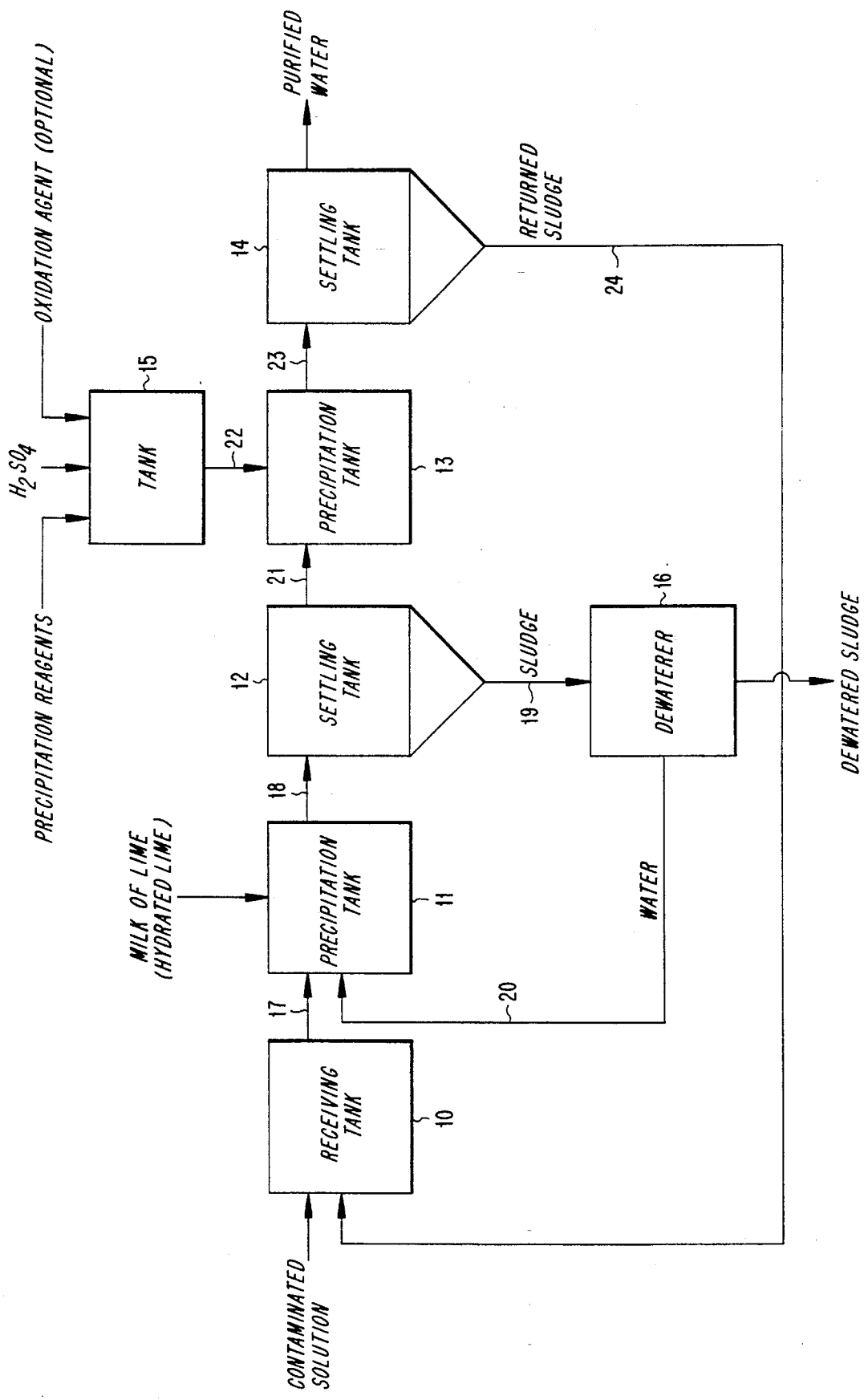

METHOD FOR PURIFYING INDUSTRIAL SEWAGE WATER

BACKGROUND OF THE INVENTION

1. Field of the Invention

The present invention relates to a method for purifying contaminated industrial sewage water solutions or other aqueous solutions which have a similar contamination profile, normally comprising ions of several metals and other contaminating elements such as As, Bi, Sb, P and Se, comprising precipitating the contaminants in two stages and returning the precipitate isolated from the second stage to the first precipitation stage.

2. Description of the Related Art

Many known methods for purifying industrial sewage water are directed primarily to certain selected contaminants or impurities and are less effective in the case of other contaminants. These processes are often complicated or often contain stages which require the use of advanced and sensitive control equipment, for instance precipitation agent metering equipment or pH-regulating equipment. Because of their complexity, sensitivity and cost, such purification methods are only used to a limited extent, or are less effective than would be desired.

Methods of the aforementioned type are known from Boliden's earlier patent specifications, for instance from EP-B-0,139,622 and EP-B-0,364,423, these publications herewith being incorporated into the present description. A fundamental concept of both of these methods is that the major part of the precipitation reagent is added in the second stage under conditions in which a voluminous metal hydroxide-metal oxide precipitate is formed. This voluminous precipitate is separated and returned to the first precipitation stage and contains a substantial part of the contaminant content and is used as an auxiliary precipitation agent in the precipitation taking place in the first stage, from which there is taken a precipitate which includes essentially the entire contaminant content of the contaminated solution. According to EP-B-0,139,622, the contaminants removed are primarily As and/or P, wherein the precipitation process in the first stage is carried out in an alkaline environment to form an arsenic-containing and/or a phosphate-containing dumpable sludge. Publication EP-B-0,364,423 relates to the purification of industrial waste solutions, for instance solutions that contain As, P and also heavy metals, wherein after adding the voluminous hydroxide precipitate taken from the second stage, purification in the first stage is effected by adding sulphide ions at a pH such as to dissolve the hydroxide precipitate. This results in the formation of a metal sulphide precipitate which can be conveniently worked-up with respect to its valuable metal content.

These known two-stage processes in which hydroxide precipitate is returned from the second stage purify industrial water sewage much more effectively and in a much simpler manner than the earlier purification processes, among other things with regard to the deficiencies of the known processes mentioned in the introduction and also with regard to general problems that occur in such purification processes. However, the aforesaid known two-stage processes can be considered too sophisticated from a technical aspect and also to be encumbered with other drawbacks in certain respects and in the case of certain uses.

The problem associated with the choice of a method for purifying industrial waste effluents, sewage water or similar contaminated aqueous solutions resides in the constant increase in the demands for generally low influence on the environment placed by the responsible authorities, for instance the limit values of the effluent to the recipient are made successively lower. The number of substances or elements to which the limit values apply also has become successively larger in number. The tolerance with which industrial effluents are considered in operational breakdowns or abnormal situations is decreasing, and consequently even short stoppages in an industrial processes which result in the discharge of effluent above current limit values can have very serious consequences for those of responsibility in the industry concerned.

These new and progressively growing requirements on reliable and operationally safe purification processes accentuate still further those problems indicated above with regard to known processes for the purification of industrial water sewage. Thus, the demands for operational safety and reliability are in addition to the earlier requirements of a good precipitation result and low outgoing residual contents. The two known Boliden methods are able to well satisfy the modern demands placed on all of the aforesaid, conceivable parameters, with regard to their particular applications and with regard to the conditions stated, for instance the presence of relatively high concentrations of As.

However, in purification situations in which the solutions or the water sewage to be purified contains highly varying concentrations of contaminants and/or a broad spectrum of contaminants, there is no method which can be applied in practice and which can be used generally to achieve accepted residual contents or concentrations while providing an operationally safe and reliable alternative at the same time.

SUMMARY OF THE INVENTION

It has now surprisingly been found possible to utilize the principle of two-stage precipitation and the return of the precipitate from the second stage to the first stage and therewith provide a general process for purifying industrial sewage water and like contaminated aqueous solutions, whereby the problems described in the introduction can be eliminated to a great extent.

DESCRIPTION OF THE PREFERRED EMBODIMENTS

Thus, in accordance with the invention, precipitation is effected in the first stage, which can be divided into a number of sub-stages, by adding lime in a surplus quantity, i.e. in a quantity in which the solution is saturated with regard to lime. In this regard, the major part of the contaminant content is precipitated and the formed precipitate is isolated together with residual undissolved lime and removed together therewith. Continued precipitation of the remainder of the contaminant content is then effected by adding a suitable reagent for precipitation at a pH within the range of 4–11. The formed precipitate is isolated and then returned, either directly or indirectly, to the first precipitation stage, i.e. either directly to the actual precipitation stage or indirectly by adding said precipitate to the sewage water at a location upstream of the first stage and allowing the precipitate to accompany the input contaminated solution to the first precipitation stage.

The lime is conveniently introduced to the system in the form of milk of lime, i.e. a slurry of CaO in water, and/or a saturated aqueous solution of hydrated lime ($Ca(OH)_2$). The precipitation reagent for the second precipitation stage is conveniently selected from the group consisting of ferro salt, ferri salt, mineral acid, such as HCl or $H_2SO_4$, or is comprised of a mixture of one or more reagents from this group. The second precipitation stage is conveniently effected at pH 7–11, preferably pH 9–10, although a lower pH—i.e. an acid solution— may be necessary in oxidized conditions when the presence of arsenic is substantial. The input solution or the input water sewage to this stage can be subjected to a preceding purification process, which may be a biological, mechanical or chemical process, before being introduced to the first precipitation stage according to the invention. In the second precipitation stage, the reagent is advantageously introduced in an amount which is proportional to the flow of aqueous solution entering this stage. In order to obtain an optimal yield, the reagent addition in the second stage may conveniently be in the form of a mixture of ferro salt, a deficit quantity of oxidation agent, and mineral acid.

The invention will now be described in more detail with reference to the accompanying drawing which illustrates a preferred flowsheet relating to the inventive method, and also to trial examples carried out in practice.

DESCRIPTION OF THE DRAWING

FIG. 1 illustrates a preferred embodiment of the invention in the form of a flowsheet.

Shown in the FIGURE is a receiving tank 10, a precipitation tank 11 and a sedimentation or settling tank 12 for the first precipitation stage. The second precipitation stage utilizes a precipitation tank 13 and a settling tank 14. Also shown is a tank 15 in which reagents introduced to the settling tank 13 are prepared, and a dewaterer 16 which dewaters sludge or mud taken from the settling tank 12.

When practicing the invention, a contaminated solution is introduced into the receiving tank 10 together with sludge returned from the settling tank 14 of the second precipitation stage. The contaminated solution may be an industrial water sewage or may derive generally from an industrial manufacturing process or the like. Because of the general nature of the invention, the solution may, in principle, contain all conceivable metal ions and also other contaminants of a nonmetallic nature derived from said industrial processes. The solutions and the sludge products entering the purification process are stirred and mixed together in the receiving tank 10. The resultant solution/sludge mixture is passed through a conduit 17 to the precipitation tank 11, to which lime is introduced in the form of milk of lime (CaO slurry) and/or slaked lime ($Ca(OH)_2$) while stirring. The precipitation tank 11 may be comprised of one or more reactors. The lime is added in a quantity such as to maintain constantly a lime surplus in the tank 11. The contents of the tank 11 will therewith have a pH of about 12. The resultant lime-sludge-aqueous suspension is passed through a conduit 18 to the settling tank 12, and sludge sediment is removed from the lower part of the tank 12 and passed through a conduit 19 to the dewaterer 16, in which the sludge is dewatered to the extent desired and then removed from the dewaterer and passed to a suitable recipient. The dewatered sludge departing from the first stage has an acidification and carbonization buffer as a result of its solid lime content deriving from the lime surplus in this stage, which is advantageous and essential when dumping the sludge. The water separated from the sludge in the dewaterer 16 is returned through a conduit 20 to the precipitation tank 11. The major part of the majority of the contaminants present in the input solutions are precipitated in the first precipitation stage (11, 12). By adding lime in a calculated surplus in accordance with the invention, the sensitivity of the input contaminant concentrations to changes is very low. The water which is passed through a conduit 21 to the second precipitation stage (13, 14) after separating sludge in the settling tank 12 will thus have a generally constant composition and therewith relatively low levels of the majority of the contaminating elements.

The solution containing the remainder of the contaminant content subsequent to purification in the first precipitation stage (11, 12) is passed from the settling tank 12 to the settling tank 13 of the second precipitation stage through a conduit 21. Reagent for precipitation contaminants in the second precipitation stage is prepared in the tank 15. The precipitation reagent is conveniently comprised of ferro salt and/or ferri salt. As indicated, these salts can be mixed with a mineral acid, such as $H_2SO_4$ in the present case, and an oxidation agent, for instance $Cl_2$. The prepared reagent mixture is introduced into the precipitation tank 13 through a conduit 22, while stirring the mixture. Since the composition of the solution entering through the conduit 21 is essentially constant, as indicated above, the addition of reagent to the second precipitation stage (13, 14) can be controlled very easily. In this regard, there can be applied a simple flow-proportional addition, optionally in combination with pH control in the precipitation tank 13. Precipitation in the second stage will preferably take place at a pH close to 10.

The contents of the precipitation tank 13 are passed through a conduit 23 to the settling tank 14, from which there is removed a sludge and purified water that can be delivered to a suitable recipient. The sludge taken from the tank 14 is returned to the receiving tank 10 through a conduit 24. The returned sludge, however, may alternatively be delivered directly to the precipitation tank 11 or to the contaminated solution prior to delivering this solution to the tank 10, while remaining within the concept of the invention which is that the sludge taken from the second purification stage shall be present in the first precipitation stage. By returning the precipitate from the second stage, there is obtained a stabilizing effect with regard to the precipitate obtained in the first precipitation stage, which greatly facilitates sedimentation and dewatering of the precipitate. Another important advantage obtained by returning this secondary sludge is that it is unnecessary to subject the sludge to a separate dewatering process thereby enabling those difficulties that occur when dewatering alkaline ferro-precipitations and like voluminous precipitations that may often be obtained in the present context to be totally avoided.

EXAMPLES

A series of laboratory tests were carried out while practicing the inventive method.

The following reagent was prepared prior to these tests:

R1: Milk of lime, 120 g CaO/litre pH=11.5

R2: Saturated aqueous solution $FeSO_4$ at t=20° C., about 1 mole Fe/liter

R3: Aqueous solution of $FeCl_3$, about 0.5 mole Fe/liter

R4: Aqueous solution containing 0.15% Praestof 2530 (Anionic polymer)

R5: Saturated solution of $Ca(OH)_2$

A synthetic start solution (L1) containing, among other things, the following substances (mg/liter) was then prepared:

| | | | |
|---|---|---|---|
| H$_2$SO$_4$ | 25,000 | Cu | 509 |
| Fe | 750 | Zn | 909 |
| As | 480 | Na | 100 |
| Cl | 1,400 | F | 600 |

In a first test series, 190 ml of R1 were first added to 1,500 ml of L1 to obtain a pH of about 6. The reaction time was 0.75 h, after which it was established that the content of As had fallen to 31 Mg/l and the content of Fe had fallen to 2 Mg/l. A further 60 ml of R1 was then added to the solution, to obtain a pH in the range of 11–12. After a reaction time of 0.75 h, the sample was filtered and the filtrate (L3) analyzed, which gave the following (mg/l):

| | | | |
|---|---|---|---|
| Fe | 2.4 | Zn | 11 |
| As | 1.2 | Pb | 0.05 |
| Se | <0.03 | | |

In a second test series, 10 g/l of As was added to L1, which was diluted to twice its volume. This solution was designated L9 and is calculated to contain, among other things, (mg/l):

| | | | |
|---|---|---|---|
| As | 5,240 | Fe | 375 |
| Zn | 455 | F | 11.6 |

A surplus quantity of R1 was added to the solution L9 to obtain pH=10.6, whereafter the sample was filtered and analyzed, giving the following result (mg/l):

| | | | |
|---|---|---|---|
| As | 10 | Fe | 1.4 |
| Ca | 1,145 | Zn | 2.9 |
| Pb | <0.02 | Se | <0.05 |
| Hg | <0.001 | F | 11.6 |

The filtrate L3 was mixed in roughly equal parts with R5 and As was added in an amount corresponding to 15 mg/l. After stirring for 1 h. at 60° C. and pH 10.5, the suspension was filtered with the addition of 1 droplet of R4. The filtrate L8 was analyzed and found to contain, among other things, the following quantities (mg/l):

| | | | |
|---|---|---|---|
| As | 3.1 | Fe | <0.1 |
| Ca | 1,100 | Zn | 3.4 |

In a further test series, reagents were added to effect a second precipitation of contaminants in the filtrate L8. There were first mixed together 80 ml of L8 and 9 ml of R2, and 2 droplets of R4 were added. The mixture was stirred for 5 min. at a temperature of 50° C. and a pH of 9.1, whereafter the mixture was filtered to obtain a filtrate having the following contents (mg/l):

| | | | |
|---|---|---|---|
| As | <0.05 | Fe | <0.1 |
| Ca | 1,100 | Zn | 0.01 |

The same tests were repeated, but in this case stirring was continued for 40 min. In this case, the zinc content fell to <0.01, whereas the Fe content rose slightly to 0.38.

Thus, it was shown that the proposed combination of solely two precipitation stages results in unexpected high separation of the majority of contaminants or impurities occurring in industrial sewage water and like sewage solutions. Because the control strategy is so simple and so easy to realize, the purification result is extremely good and reliable. The addition of lime in surplus quantities in the first precipitation stage in accordance with the invention thus provides a filtrate to the second precipitation stage which has practically constant composition and with relatively low concentrations of the majority of contaminating elements. This enables the addition of precipitating reagents in the second precipitation stage to be easily controlled so as to achieve a predetermined purification effect.

I claim:

1. A method for purifying contaminated industrial sewage water solutions or other aqueous solutions having varying concentrations of contaminants and/or various contaminants including ions of metals and elements selected from the group consisting of As, Bi, Sb, P and Se, said method consisting essentially of conducting precipitation in a first precipitation stage by adding lime in a surplus quantity whereby a pH of about 12 is established and maintained in the solution and contaminant is precipitated so as to form a solution and to form a precipitate that is isolated and removed together with residual lime, conducting precipitation in a second precipitation stage by adding a reagent for precipitation at a pH in the range of 4–11 wherein residual contaminant in the formed solution from the first precipitation stage is precipitated in the second precipitation stage and wherein the precipitate from the second precipitation stage is isolated and returned to the first precipitation stage.

2. The method of claim 1 wherein the lime is added in the form of milk of lime and/or a saturated aqueous solution of Ca(OH)$_2$.

3. The method of claim 2 wherein the precipitation reagent added in the second stage is selected from the group consisting of ferro salt, ferri salt, mineral acid and mixtures thereof.

4. The method of claim 3 wherein the second precipitation stage is conducted at a pH in the range of 7 to 11.

5. The method of claim 4 wherein the second precipitation stage is conducted at a pH in the range of 9 to 10.

6. The method of claim 5 wherein the solution to be purified is first subjected to chemical or mechanical pre-purification.

7. The method of claim 6 wherein the precipitation reagent is added in the second precipitation stage in an amount which is proportional to the flow of solution entering said second precipitation stage.

8. The method of claim 7 wherein the precipitation reagent added in the second stage is comprised of a mixture of ferro salt, an oxidation agent in an amount that is insufficient to oxidize the oxidizable matter in the solution, and mineral acid.

9. The method of claim 8 wherein the first precipitation stage is conducted is conducted in a plurality of steps.

10. The method of claim 1 wherein the precipitation reagent added in the second stage is selected from the group consisting of ferro salt, ferri salt, mineral acid and mixtures thereof.

11. The method of claim 1 wherein the second precipitation stage is conducted at a pH in the range of 7 to 11.

12. The method of claim 11 wherein the second precipitation stage is conducted at a pH in the range of 9 to 10.

13. The method of claim 1 wherein the solution to be purified is first subjected to chemical or mechanical pre-purification.

14. The method of claim 1 wherein precipitation reagent is added in the second precipitation stage in an amount which is proportional to the flow of solution entering said second precipitation stage.

15. The method of claim 1 wherein the precipitation reagent added in the second stage is comprised of a mixture of ferro salt, an oxidation agent in an amount that is insufficient to oxidize the oxidizable matter in the solution, and mineral acid.

16. The method of claim 1 wherein the first precipitation stage is conducted is conducted in a plurality of steps.

17. The method of claim 1 wherein the precipitate from the second precipitation stage is returned directly to the first precipitation stage.

* * * * *

UNITED STATES PATENT AND TRADEMARK OFFICE
CERTIFICATE OF CORRECTION

PATENT NO. : 5,618,439
DATED : April 8, 1997
INVENTOR(S) : Torkel Allgulin

It is certified that error appears in the above-identified patent and that said Letters Patent is hereby corrected as shown below:

Claim 9, col. 6, line 59, delete the second occurrence of "is conducted".

Claim 16, col. 8, line 4, delete the second occurrence of "is conducted".

Signed and Sealed this

Fifteenth Day of December, 1998

Attest:

BRUCE LEHMAN

Attesting Officer

Commissioner of Patents and Trademarks